(12) United States Patent
Delfyett et al.

(10) Patent No.: US 8,717,657 B2
(45) Date of Patent: May 6, 2014

(54) OPTOELECTRONIC OSCILLATOR USING A HIGH FINESSE ETALON

(75) Inventors: Peter J. Delfyett, Orlando, FL (US); Ibrahim T. Ozdur, Orlando, FL (US)

(73) Assignee: University of Central Florida Research Foundation, Inc., Orldando, FL (US)

( * ) Notice: Subject to any disclaimer, the term of this patent is extended or adjusted under 35 U.S.C. 154(b) by 411 days.

(21) Appl. No.: 13/117,271

(22) Filed: May 27, 2011

(65) Prior Publication Data

US 2011/0292486 A1 Dec. 1, 2011

Related U.S. Application Data

(60) Provisional application No. 61/349,427, filed on May 28, 2010.

(51) Int. Cl.
*G02F 1/21* (2006.01)

(52) U.S. Cl.
USPC .......................................... 359/260

(58) Field of Classification Search
USPC ............... 359/245, 260, 584, 589; 372/18, 26
See application file for complete search history.

(56) References Cited

U.S. PATENT DOCUMENTS

| | | | |
|---|---|---|---|
| 5,723,856 A | 3/1998 | Yao et al. | |
| 5,777,778 A | 7/1998 | Yao | |
| 6,845,108 B1 * | 1/2005 | Liu et al. | 372/20 |
| 7,492,795 B1 * | 2/2009 | Delfyett et al. | 372/29.011 |

OTHER PUBLICATIONS

Nelson, et al., "Microwave Optoelectronic Oscillator with Optical Gain", IEEE, pp. 1014-1019, 2007.
Neyer, et al., "High Fredquency Electrooptic Oscillator Using an Integrated Interferometer", Appl. Phyz. Lett., vol. 40, pp. 6-8, 1982.
Lewis, "Novel RF Oscillator Using Optical Compnents", Electron Lett. vol. 28, pp. 31-32, 1992.
Yao, et al., "Optoelectronic Microwave Oscillator", J. Opt. Soc. Amer. B., vol. 13, No. 8, pp. 1725-1735, Aug. 1996.
Salik, et al., "An Ultralow Phase Noise Coupled Optoelectronic Oscillator", IEEE Photon, Technol. Lett., vol. 19, No. 6, pp. 444-446, Mar. 2007.
Davidson, et al., "High Spectral Purity CW Oscillation and Pulse Generation in Optoelectronic . . . ", IEE Electron. Lett., vol. 35, No. 15, pp. 1260-1261, Jul. 1999.
Yao, et al, "Coupled Optoelectronic Oscillators for Generating Both RF Signal and Optical Pulses", J. Llghw. Technol., vol. 18, No. 1, pp. 73-78, Jan. 2000.
Yao, et al., "Multiploop Optoelectronic Oscillator", IEEE I. Quantum Electron., vol. 36, No. 1, pp. 79-84, Jan. 2000.
Shumakher, et al., ,"A Novel Multiploop Optoelectronic Oscillator", IEEE Photon. Technol. Lett., vol. 20, No. 22, pp. 1881-1883, Nov. 2008.
Yang, et al., "An Optical Domain Combined Dual-Loop Optoelectornic Oscillator", IEEE PHoton, Technol. Lett., vol. 19, No. 11, pp. 807-809, Jun. 2007.
Strekalov, et al., "Stabilizing an Optoelectronic Microwave Oscillator With Photonic Filters", J. Llghtw. Technol. vol. 21, No. 12, pp. 3052-3061, Dec. 2003.

* cited by examiner

*Primary Examiner* — Joseph P Martinez
(74) *Attorney, Agent, or Firm* — Steven B. Kelber; Alchemy-Partners, PC

(57) ABSTRACT

An optoelectronic oscillator (OEO) is used to provide a continuous, high Q, modulated signal for a variety of purposes, including a carrier wave for communications, and radar emissions. The OEO of this invention replaces an RF filter in the conventional OEO with an interferometer, preferably a high finesse Fabry-Perot etalon as the mode selector, providing lower phase noise and higher RF frequency stability.

10 Claims, 5 Drawing Sheets

OPTOELECTRONIC OSCILLATOR USING A HIGH FINESSE ETALON

This work was supported by the Defense Advanced Research Programs Agency under the PHOBIAC program and National Science Foundation under contract DMR 0120967. The United States Government may enjoy certain rights in the invention(s) claimed herein.

PRIORITY DATA AND INCORPORATION BY REFERENCE

This application claims benefit of priority to U.S. Provisional Patent Application No. 61/349,427 filed May 28, 2010 which is incorporated by reference in its entirety.

BACKGROUND OF THE INVENTION

1. Field of the Invention

The present invention relates to optoelectronic oscillators of improved performance providing high RF frequency stability and reduced noise. These find application in a wide variety of fields, wherever signal generation is required at high respective frequencies with reduced noise, such as radar.

2. Background of the Invention

Microwave generators with multi gigahertz frequency, high spectral purity and high RF frequency stability have applications in many areas such as communication, radar and metrology. Different approaches can be used to obtain high spectral purity and high repetition rate signals. Conventional electronic approaches rely on using a high quality factor (Q) resonator in order to get high spectral purity. Generating microwave signals with electro-optical systems have been studied previously [1,2]. The current optoelectronic oscillator (hereinafter "OEO") design, introduced by Yao and Maleki, use optical fibers as the high Q element, and have attracted great attention due to their extraordinary spectral purity [3,4]. Several different types of OED's are demonstrated successfully [5] such as the coupled optoelectronic oscillator [6], multi loop OEO architectures [7-9], and OEO with photonic filters that use atomic cells [10]. A standard OEO loop is shown in FIG. 1(a). The conventional OEO consists of a seed laser source followed by a modulator. After passing through an optical delay line, the signal is photodetected, amplified and filtered by an RF filter, and then sent back to the modulator to complete the loop. There are some drawbacks of the standard OEO: a high gain RF amplifier is needed in order to compensate the losses in the RF loop, and it is costly to make an ultra narrow bandwidth RF filter which is required when the optical delay line is long. Moreover, the additional loss from the RF filter decreases the cavity Q of the optoelectronic oscillator which results in an increase in the phase noise. Another drawback of the RF filter is the temperature dependency; small fluctuations of the temperature result in fluctuations at the peak position of the resonance, and hence the phase from the RF filter changes. This phase change affects the total round trip time for the microwave signal, thus changing the oscillation frequency.

OED's of the type described find application in a variety of devices and methods. Radar and signal intelligence are standard applications. OEO generated signals may be used as carriers and are important in clock recovery, and in communication broadcasting and receiving. A single loop OEO is described in detail in U.S. Pat. No. 5,723,856 and a multi-loop OEO is shown in U.S. Pat. No. 5,777,778

SUMMARY OF THE INVENTION

Most OED's employ an RF Filter as the mode selector for signal generation. See for instance, [11] and U.S. Pat. No. 5,777,778. In this invention, a F-P interferometer, or etalon, is used in replacement of the RF Filter. In one embodiment, a 10.287 GHz optoelectronic oscillator is demonstrated which uses a 1000 finesse Fabry-Perot etalon as the mode selector instead of an RF filter. The results are compared with a standard optoelectronic loop with an RF filter. The substitution of the RF filter with the optical filter results in a higher RF frequency stability and lower phase noise.

We describe an optoelectronic loop design which uses a high finesse Fabry-Perot etalon as the mode selector instead of an RF filter. The inclusion of the Fabry-Perot etalon instead of the RF filter results in less phase noise, due to the higher Q, and also results in higher RF frequency stability due to the ultralow temperature dependency of the Fabry-Perot etalon. The results of the OEO with a Fabry-Perot etalon are compared to the conventional OEO with the RF filter. When the same laser source, intensity modulator, optical delay length and RF amplifier are used, the OEO with the Fabry-Perot etalon results in lower phase noise and higher RF frequency stability.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE INVENTION

Figure 1A:
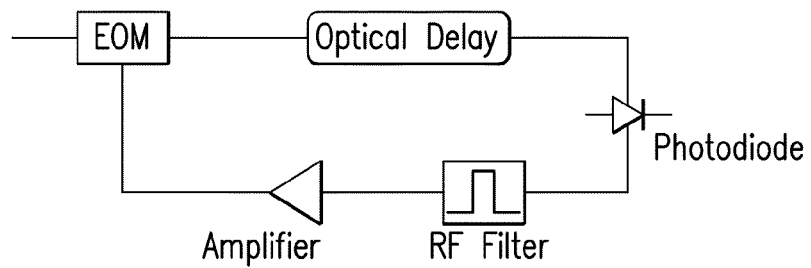
FIG. 1 is (a) standard OEO scheme with RF filter; (b) filtering of one of the RF modes (Av is the beat tone of the adjacent optical modes) by using an RF filter; (c) OEO scheme with Fabry-Perot etalon; (d) filtering of the optical modes with the etalon transmission function and (e) beat tone of the optical modes which are separated by co or free spectral range (FSR) of the etalon.
Figure 1B:
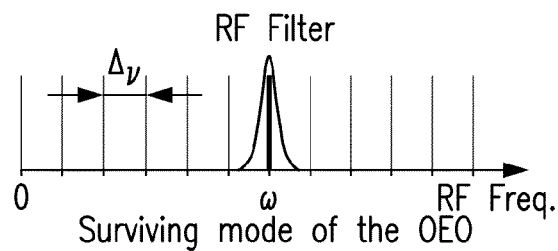

The conventional OEO design shown in FIG. 1(a), has an electro-optic modulator (EOM), optical delay, photodiode, RF filter and RF amplifier. The microwave signal is imposed on the optical beam and the optical delay acts as a microwave energy storage device. Long delay lines are required in order to achieve a high microwave Q, which results in many closely separated microwave modes. A narrow-band RF filter is necessary to filter out the closely separated RF modes in order to obtain stable oscillation. In FIG. 1(b), Av is the supported RF tone separation and w is the oscillation frequency which is determined by the RF filter bandpass frequency.

Figure 1C:
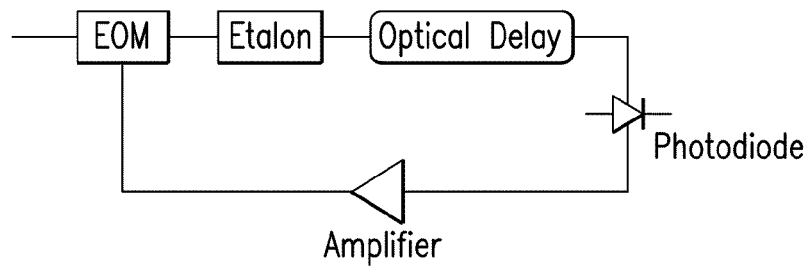
Figure 1D:
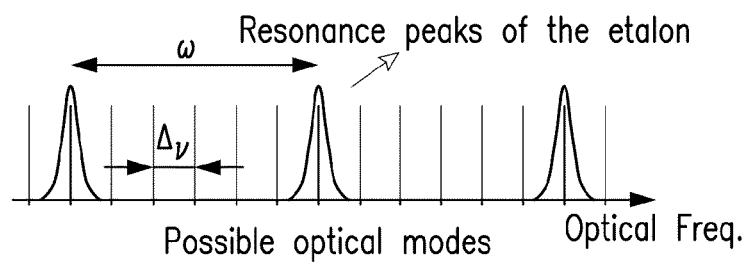
Figure 1E:
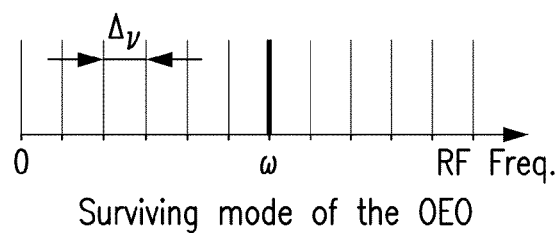

Our inventive OEO design, using a Fabry-Perot etalon, is shown in FIG. 1(c). The OEO has an EOM, an etalon as the resonant mode selector, optical delay line, photodiode and RF amplifier. The supported optical modes are shown in FIG. 1(d). The periodic transmission function of the etalon allows only the optical frequencies which are separated by the free spectral range (FSR) of the etalon to oscillate and eliminates the frequencies outside the resonance width. In this technique, the microwave oscillation frequency is determined by the FSR of the etalon. In FIG. 1(d), Av represents the optical mode separation and co is the FSR of the etalon. Since the RF domain signal results from the beating of the optical modes which are separated by w, only one microwave oscillation mode is allowed in the RF domain and the RF filter is no longer required, as shown in FIG. 1(e).

EXAMPLE

Figure 2:
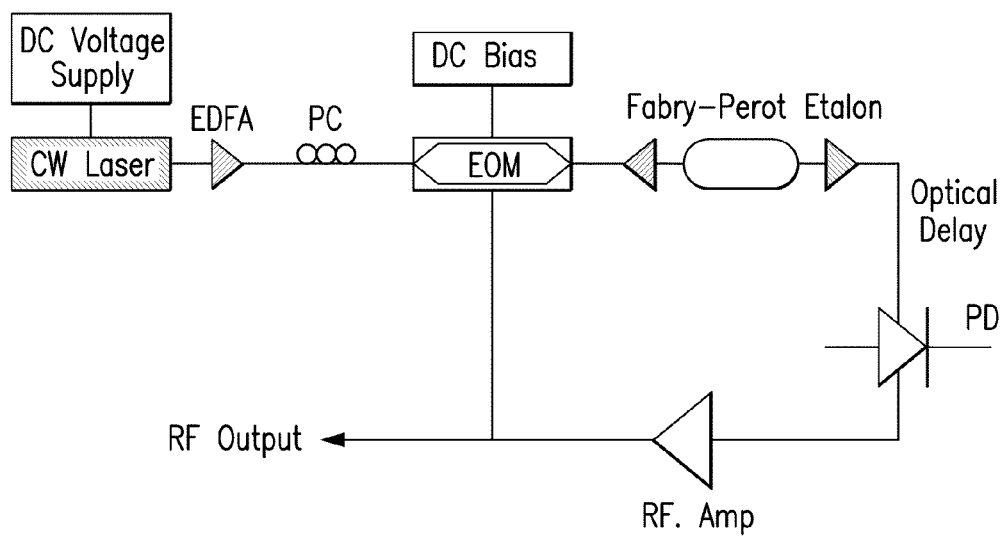
FIG. 2: The schematic of the OEO with Fabry-Perot etalon setup. EDFA: Erbium Doped Fiber Amplifier; PC: polarization controller; EOM: electrooptic modulator; PD: photodiode; RF. Amp.; and RF. Amplifier.

The schematic of the OEO with the Fabry-Perot etalon is shown in FIG. 2. A 1550 nm CW laser is used as the light source. The optical frequency of the CW laser is tunable by applying an external voltage. The output of the CW laser is amplified and sent to the electro-optic modulator (EOM) which is biased at quadrature. A 1000 finesse Fabry-Perot etalon with 10.287 GHz free spectral range (FSR) is used as the mode selector, as described. The etalon's stability is advantageous as it becomes the primary frequency reference in the OEO. The etalon is made of ultralow expansion quartz and is sealed, so it is less susceptible to environmental changes, such as temperature or air pressure. The full width half maximum (FWHM) of the resonance of the etalon is 10 MHz. The fiber to fiber insertion loss of the etalon is only 1 dB. A total optical delay of ten (10) meters is employed in order to get sufficient electrical supermode suppression. The photodiode has 16 GHz bandwidth with 0.8 A/W responsitivity, and is followed by a 40 dB gain RF amplifier. A 10 dB output coupler is used to extract the RF power and the remaining power fed back to the EOM.

Figure 3:
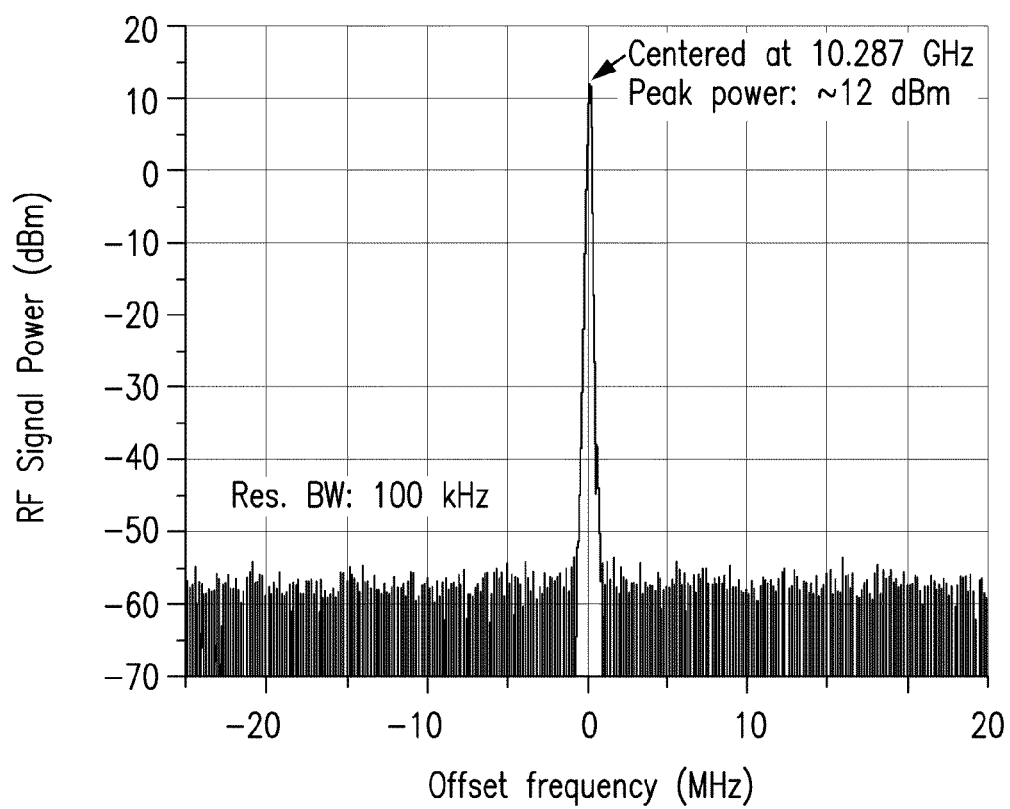
FIG. 3. RF spectrum of OEO tone centered at 10.287 GHz.

The RF spectrum of the OEO is shown in FIG. 3. The RF power of the tone centered at 10.287 GHz is 12 dBm. No other RF modes or mode hopping is observed during the experiment.

The phase noise and RF frequency stability performance of the OEO is also measured and compared with the standard OEO. In the standard OEO, the Fabry-Perot etalon is replaced by an RF filter with other components and parameters kept constant. The RF filter used in the experiment has a 3 dB bandwidth of 13 MHz, centered at 10.287 GHz and has an insertion loss of 5 dB. The total optical delay is kept constant by adding an appropriate amount of fiber to the cavity.

Figure 4:
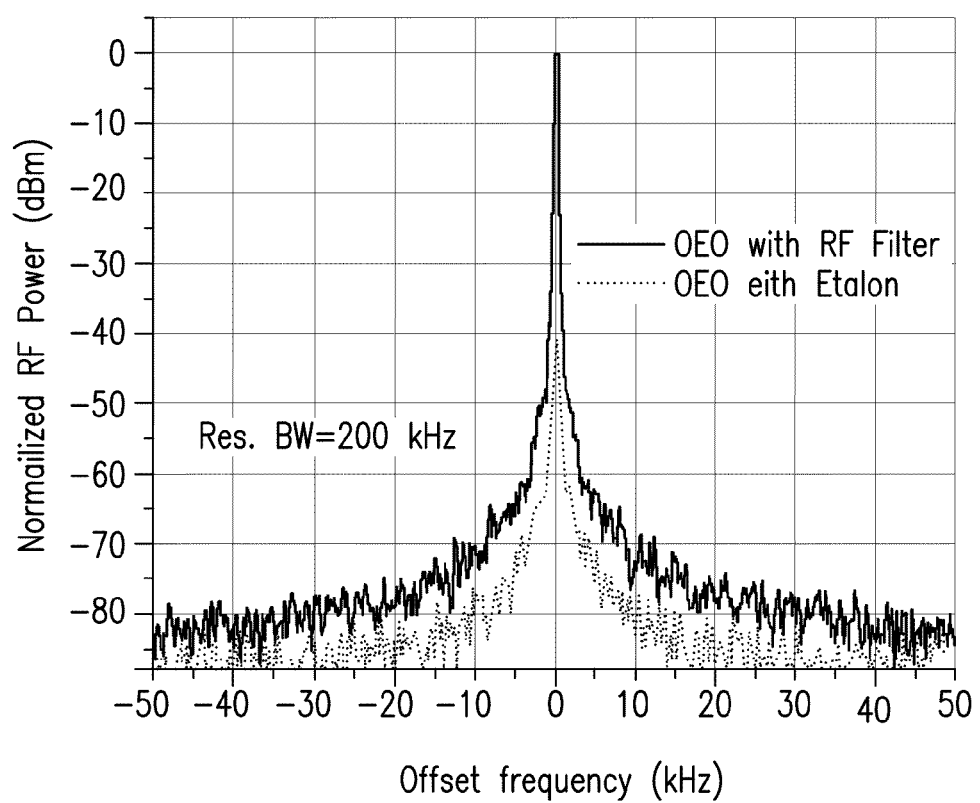
FIG. 4. Comparison of phase noise of the OEO with RF filter and with etalon (Normalized power).

The comparison of the phase noise of the OEO with an RF filter and the OEO with an etalon is shown in FIG. 4. The OEO with the RF filter has 5-10 dB less signal-to-noise ratio (SNR) than the OEO with Fabry-Perot etalon at close offset frequencies. The SNR at 10 kHz offset from the carrier for the OEO with Fabry-Perot etalon is 100 dBc/Hz.

Figures 5A, 5B:
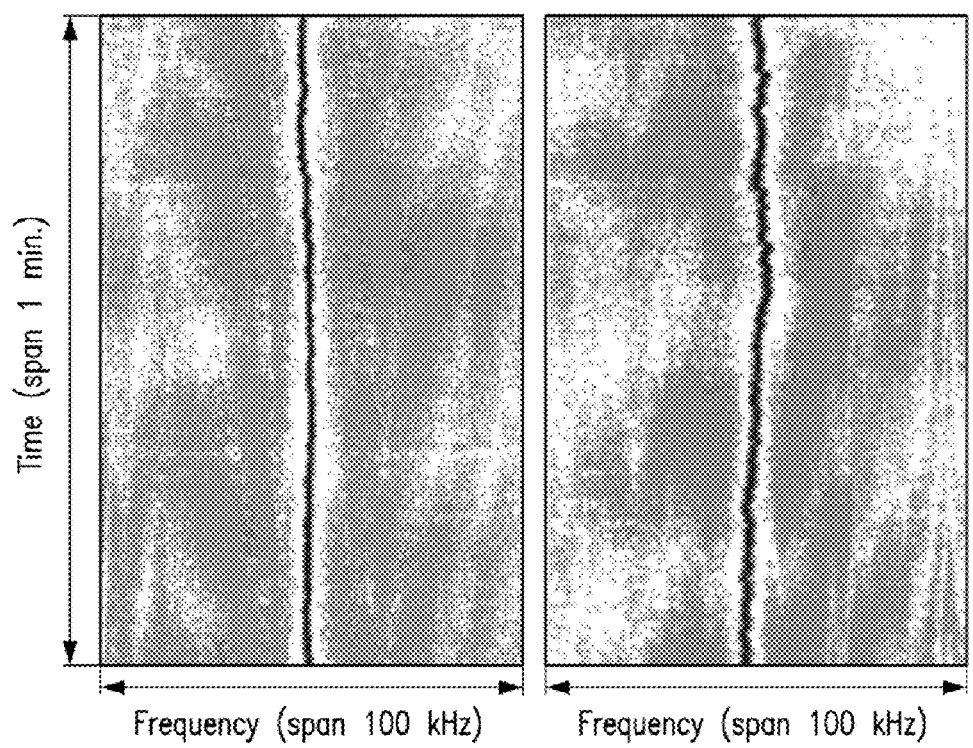
FIG. 5. Spectrogram of the RF traces over one (1) minute of OEO with Fabry-Perot etalon (a) and with RF filter (b).

The RF stability of the oscillation frequency is also measured using a real time RF spectrum analyzer in the spectrogram mode and compared for the two (2) OEO designs (FIG. 5). The RF frequency stability over one (1) minute for the OEO with the Fabry-Perot etalon is 2.6 kHz whereas the stability for the standard OEO is 5.75 kHz. FIG. 5 clearly shows the improved stability due to the ultra stable Fabry-Perot etalon used as the filter.

This disclosure demonstrates an optoelectric oscillator (OEO) which uses an ultra stable 1000 finesse Fabry-Perot etalon as the oscillator mode selector. The selection of the modes is performed in the optical domain by the use of the periodic etalon transfer function. The OEO oscillation frequency is defined by the free spectral range of the etalon. The performance of the new OEO is compared with the standard OEO design with an RF filter. When all the other parameters are kept constant, except the mode selector, the OEO with the Fabry-Perot etalon results in a better phase noise performance and higher RF frequency stability. The resonance bandwidth of the etalon can be narrowed easily by using a higher finesse etalon which allows inserting very long optical fiber delays to the OEO. When higher finesse etalons are used, a CW laser frequency locking system such as Pound-Drever-Hall (PDH) method may be required to lock the laser frequency to the etalon resonance peak.

REFERENCES

[1] A. Neyer and E. Voges, "High-frequency electro-optic oscillator using an integrated interferometer," AppL Phys. Lett., vol. 40, pp. 6-8, 1982.

[2] M. F. Lewis, "Novel RF oscillator using optical components," Electron. Lett., vol. 28, pp. 31-32, 1992.

[3] X. S. Yao and L. Maleki, "Optoelectronic microwave oscillator," J. Opt. Soc. Amer. B, vol. 13, no. 8, pp. 1725-1735, August 1996.

[4] E. Salik, N. Yu, and L. Maleki, "An ultralowphase noise coupled optoelectronic oscillator," IEEE Photon. Technol. Lett., vol. 19, no. 6, pp. 444-446, March 2007.

[5] T. Davidson, P. Goldgeier, G. Eisenstein, and M. Orenstein, "High spectral purity CW oscillation and pulse generation in optoelectronic microwave oscillator," IEE Electron. Lett., vol. 35, no. 15, pp. 1260-1261, July 1999.

[6] X. S. Yao, L. Davis, and L. Maleki, "Coupled optoelectronic oscillators for generating both RF signal and optical pulses," J. Lightw. Technol., vol. 18, no. 1, pp. 73-78, January 2000.

[7] X. S. Yao and L. Maleki, "Multiloop optoelectronic oscillator," IEEE I. Quantum Electron., vol. 36, no. 1, pp. 79-84, January 2000.

[8] E. Shumakher and G. Eisenstein, "A novel multiloop optoelectronic oscillator," IEEE Photon. Technol. Lett., vol. 20, no. 22, pp. 1881-1883, November 2008.

[9] J. Yang, Y. Jin-Long, W. Yao-Tian, Z. Li-Tai, and Y. En-Ze, "An optical domain combined dual-loop optoelectronic oscillator," IEEE Photon. Technol. Lett., vol. 19, no. 11, pp. 807809, June 2007.

[10] D. Strekalov, D. Aveline, Y. Nan, R. Thompson, A. B. Matsko, and L. Maleki, "Stabilizing an optoelectronic microwave oscillator with photonic filters," J. Lightw. Technol., vol. 21, no. 12, pp. 3052-3061, December 2003.

[11] C. W. Nelson, A. Hati, D. A. Howe, IEEE, 2007, 1014-1019.

While the present invention has been disclosed both generically, and with reference to specific alternatives, those alternatives are not intended to be limiting unless reflected in the claims set forth below. The invention is limited only by the provisions of the claims, and their equivalents, as would be recognized by one of skill in the art to which this application is directed

What is claimed is:

1. An optoelectronic oscillator (OEO) comprising a Fabry-Perot etalon interferometer as a mode selector in said OEO, wherein said mode selector selects optical frequencies to enable said OEO to emit a single radio frequency (RF) tone.

2. The OEO of claim 1, wherein said OEO further comprises a light signal source, electro-optic modulator, an optical delay passage, a photodiode and a radio frequency (RF) amplifier.

3. The OEO of claim 2, wherein said light signal source comprises a continuous wave laser.

4. The OEO of claim 2, wherein said OEO provides an output oscillation frequency in the microwave range.

5. The OEO of claim 2, wherein said optical delay passage comprises a length of optical fiber.

6. The OEO of claim 2, wherein said OEO further comprises an output coupler to return a portion of the signal emitted by the photodiode to the electro-optic modulator.

7. The OEO of claim 1, wherein the RF frequency stability over one (1) minute is 2.6 KHz.

8. A signal generating apparatus, wherein said apparatus emits a modulated signal, and said apparatus comprises the OEO of claim 1.

9. The apparatus of claim 8, wherein said apparatus comprises the OEO of claim 3.

10. The apparatus of claim 8, wherein said apparatus comprises a radar signal generator.

* * * * *